United States Patent
Thorn et al.

[11] Patent Number: 6,082,246
[45] Date of Patent: Jul. 4, 2000

[54] TELESCOPING COFFEE AND TEA BREWER

[76] Inventors: Richard P. Thorn; Barbara Mason Thorn, both of 7217 Beverly Dr., Rowlett, Tex. 75088

[21] Appl. No.: 08/884,515

[22] Filed: Jun. 27, 1997

[51] Int. Cl.[7] ..................................................... A47J 31/00
[52] U.S. Cl. ................................. 99/284; 99/304; 99/306; 99/279
[58] Field of Search .............................. 99/284, 304, 305, 99/306, 279, 290; 211/207; 248/404, 125.8; 108/147, 147.19; 312/312, 223.1; 141/369, 370, 371, 376

[56] References Cited

U.S. PATENT DOCUMENTS

| | | | |
|---|---|---|---|
| 1,710,623 | 4/1929 | Johnson | 141/371 |
| 2,245,389 | 6/1941 | Cremer | 99/305 |
| 2,591,071 | 4/1952 | Huggins et al. | 141/371 |
| 4,054,085 | 10/1977 | Tarr | 99/284 |
| 4,829,888 | 5/1989 | Webster et al. | 99/284 |
| 4,892,031 | 1/1990 | Webster et al. | 99/284 |
| 5,408,940 | 4/1995 | Winchell | 108/147 |

*Primary Examiner*—Reginald L. Alexander
*Attorney, Agent, or Firm*—William H. Pavitt; David A. Belasco; Beehler & Pavitt

[57] ABSTRACT

A height-adjustable coffee or tea brewer is described. The invention includes a base element that may include a selectively operable warming plate. A vertical stand includes two slidably engagable components that may be vertically displaced with respect to one another. The first of these components is attached to the base element and the second is attached to a head element. The head element may be provided with a device to accept a funnel or other mechanism to hold coffee or tea. The head element may also contain a device for heating water or may simply be plumbed to a hot water source. The height-adjustable feature permits the coffee or tea brewer to fill thermally insulated and other containers of varying height.

8 Claims, 3 Drawing Sheets

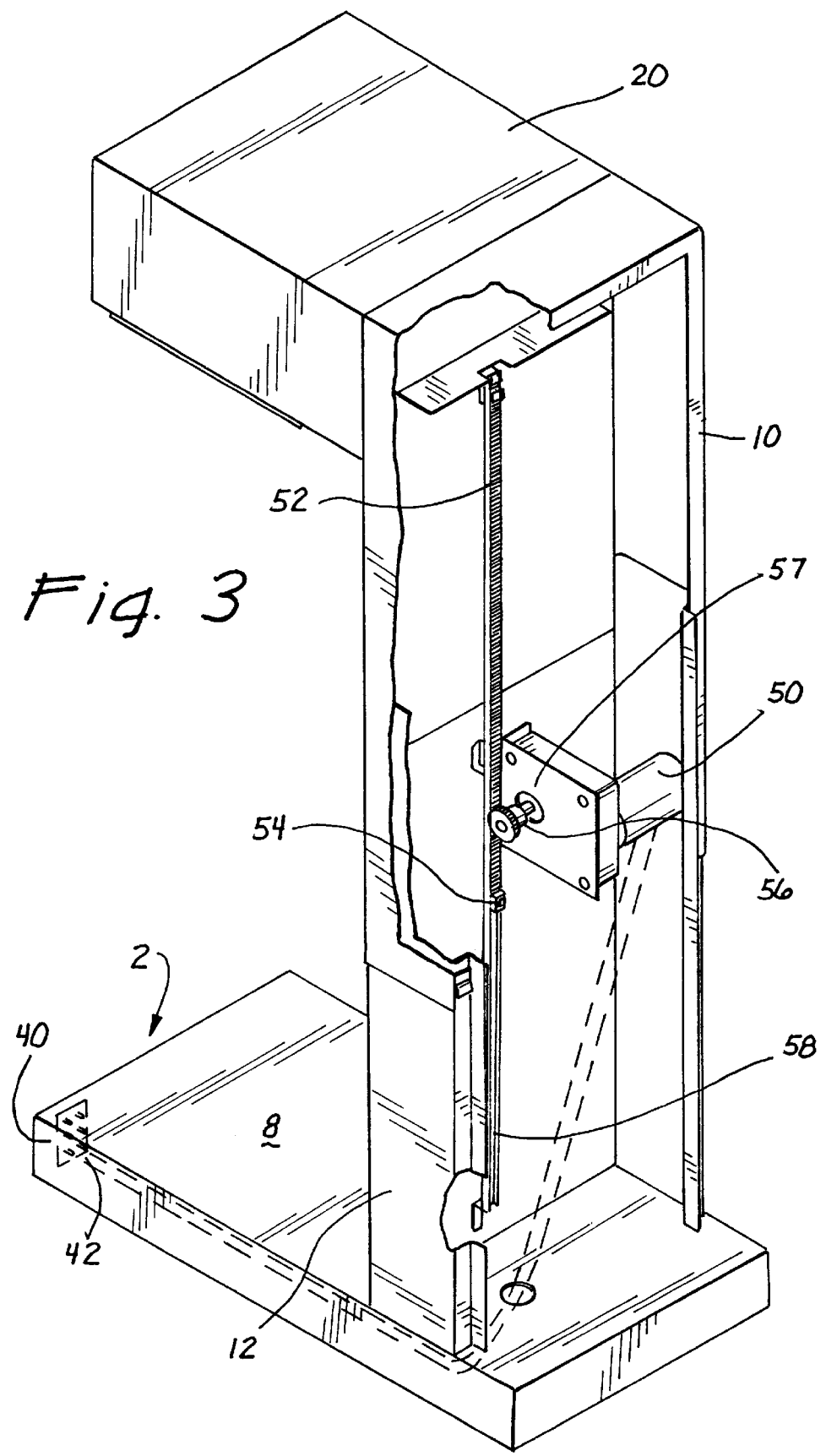

TELESCOPING COFFEE AND TEA BREWER

BACKGROUND OF THE INVENTION

1. Field of the Invention

The present invention generally relates to coffee and tea brewers of the type generally found in restaurants or other commercial establishments. The present invention more specifically relates to a coffee or tea brewer where the hot water where the height of the hot water outlet is user adjustable above the base depending on the size of the storage vessel.

2. Description of the Prior Art

Various types of automatic coffee and tea brewers have been introduced in the marketplace for commercial and home use. Most of these devices include a base which often includes a warming plate, a vertically disposed structure or stand coupled to the base and a head portion coupled to the stand and extending over the base. Below the head portion and immediately above the warming plate is an insertable funnel adapted to receive a filter to hold, in a preferred embodiment, coffee or tea.

The head portion of the brewer generally accommodates a water reservoir into which water is poured to be heated for the brewing processes. In other embodiments, the head portion is coupled directly to a hot water inlet. In still another embodiment, the head may accommodate an internal heating system to heat cold water introduced to the head by an external line. Such an embodiment is described and claimed in applicant's U.S. Pat. No. 4,871,089, as issued for a "Hot Water Dispenser".

Traditionally, it has been common in commercial establishments to leave the brewed coffee or tea on the warming plate in the familiar glass coffee pot pending its use and consumption. Such coffee pots, however, allow for rapid cooling of the brewed product, and further does not allow, in the instance of brewed teas, for steeping. Furthermore, in larger commercial establishments, the use of the traditional glass coffee pot as a transportation and storage device is not practical. As a result, the coffee pot has in many contemporary applications been replaced by the use of the coffee urn or thermos. Such urn and thermos offer the capability to store the hot coffee or tea so as to preserve a desired temperature for a much longer time period. Such vessels also allow the transportation of the hot liquid in a closed, sealed container.

Disadvantages surrounding the use of such urns and thermos bottles revolve around their size which in most instances does not fit within even the largest commercial coffee makers. As a result, the coffee or tea must first be dripped into the conventional glass coffee pot and then transferred into the insulated thermos or urn.

The compatibility of automatic coffee or tea brewers with contemporary urn and insulated thermos bottles has been addressed in U.S. Pat. No. 4,054,085 as issued to Tarr. The device claimed in the '085 patent provided for a manual means to raise the height of the head above the base by the insertion of an adapter. The use of this adapter, however, required that the entire brewer be disassembled in order for the adapter to be inserted. This adapter, while helpful to accommodate larger containers, was inflexible once inserted and thus did not allow for the use of containers of various sizes.

SUMMARY OF THE INVENTION

The present invention addresses the above and other disadvantages of prior art brewers and adaptations to make such brewers more compatible with various sized containers.

The brewer of the present invention comprises a base element which includes, in a preferred embodiment, a warming plate that may be selectively actuatable, a vertical element or stand fixedly disposed to said base element where the stand defines two slidably engageable components, means to move said components so as to alter the height of the stand, and a head element which may, in a preferred embodiment, be provided with means to accept a funnel or other mechanism to hold coffee or tea.

The present invention presents a number of advantages over prior art brewers in that since it possess a selective height adjustment it can be made readily compatible with containers of varying sizes. Moreover, the height adjustment allowed by the brewer of the instant invention can be easily implemented by the user without the need for disassembly or the use of mechanical spacers.

BRIEF DESCRIPTION OF THE DRAWINGS

FIG. 3 is a view of the embodiment illustrated in FIG. 2, where only components of the movement means are illustrated.

DETAILED DESCRIPTION OF THE PREFERRED EMBODIMENTS

Figure 1:
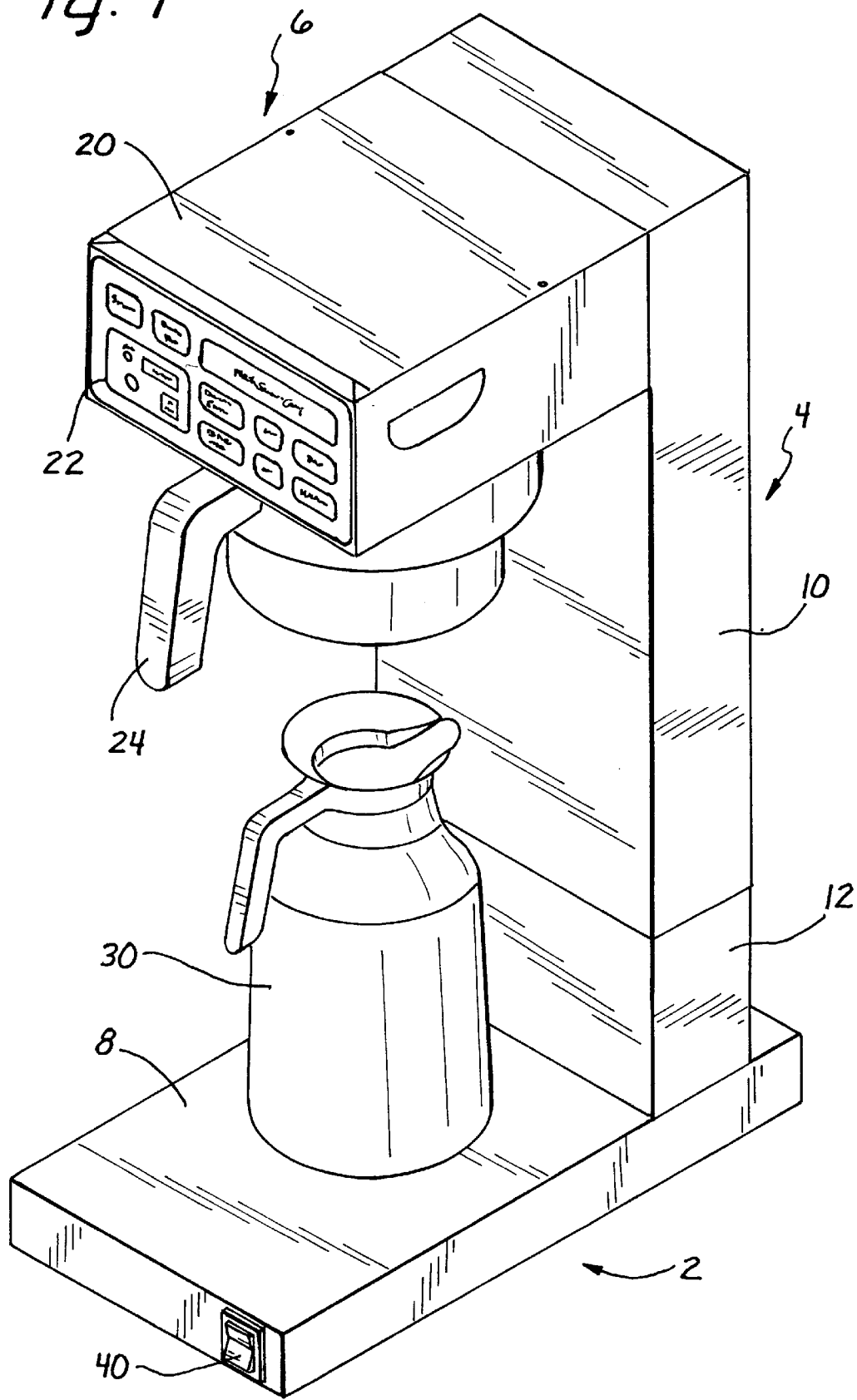
FIG. 1 is an oblique view of one preferred embodiment of the present invention.
Figure 2:
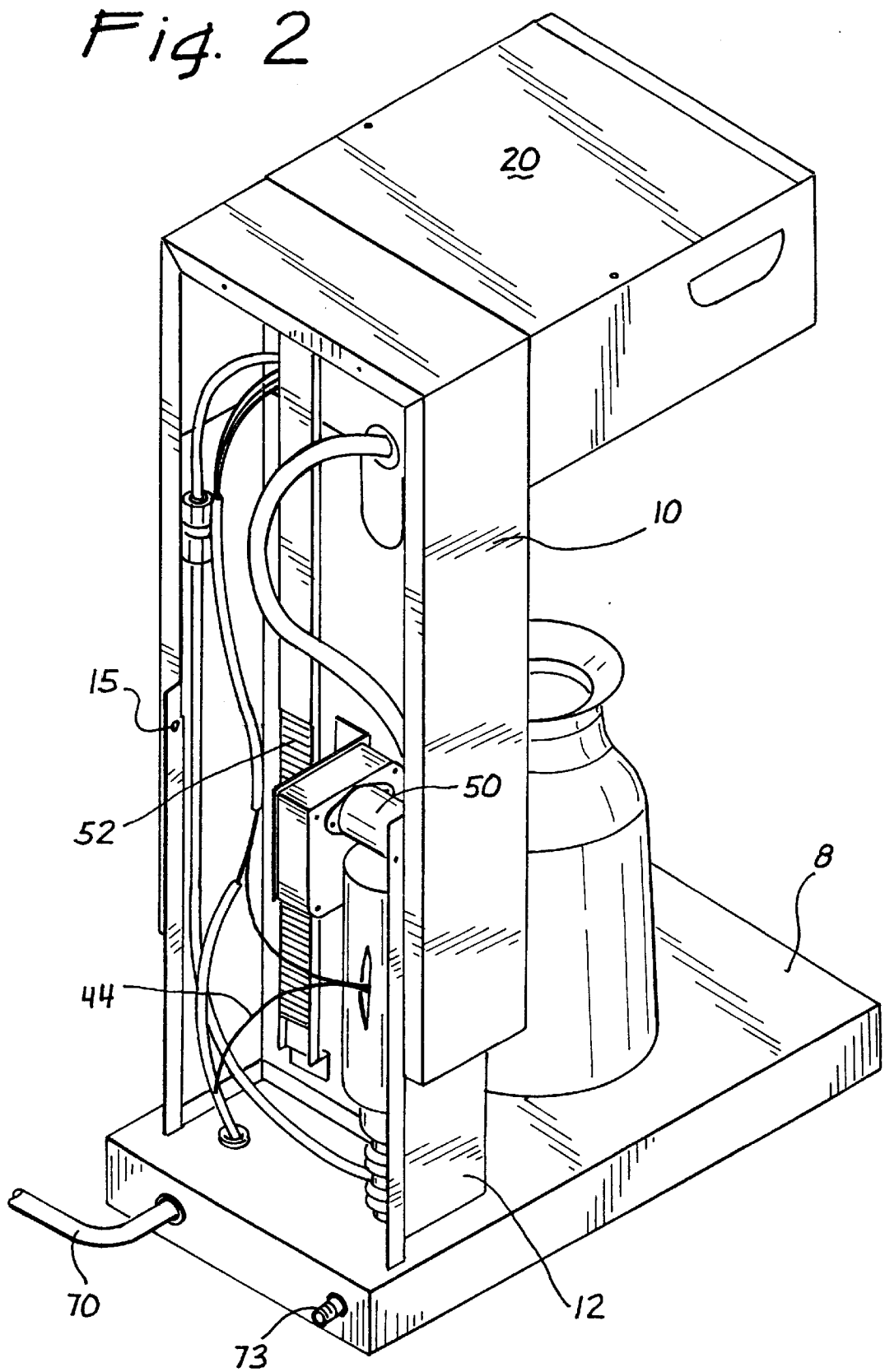
FIG. 2 is a view of the embodiment illustrated in FIG. 2.

The present invention may be seen by reference to FIGS. 1–3.

By reference to FIG. 1, the present invention comprises a base 2, an upright support element 4 secured to said base 2 and a head element 6. Base element 2 preferably defines a planar top surface 8 on which may be situated an optional warming plate (not shown) for use with conventional coffee ware. By reference to FIG. 2, base 2 preferably accommodates an inlet 70 from a water source (not shown) and an electrical inlet 73 for use with a conventional power source (also not shown). In the embodiment illustrated in FIG. 1, base 2 also accommodates an user height adjustment switch 40, as will be described in greater detail below.

Support element 4 is comprised of a fixed member 12 and a moveable member 10, where said members 10 and 12 are slidably disposed in a telescoping relationship. In a preferred embodiment, both members 10 and 12 describe a "C" shape in vertical cross section, thereby defining a concave hollow area. As illustrated, this hollow area is oriented at the back of the unit, when viewed from the front, and serves as an access space to house the various components of the instant invention, as will be described below. In a preferred embodiment, fixed member 12 is secured to base 2 via conventional fasteners although other means of attachment, e.g. welding or unitary construction are also envisioned within the spirit of the invention. In the embodiment illustrated in FIGS. 1–3, member 12 is slidably moveable within member 10 to the limit of mechanical stops provided by fasteners 15, and as otherwise described below.

Movement between elements 10 and 12, and thus the vertical position of head 6 above base 2, is accomplished, in a preferred embodiment, by a reversible motor 50, for example a 1/125 horsepower motor, model no. 2L010 as made by Dayton. Motor 50 is secured to the inner or hollow portion of member 10 as illustrated. Revolutions from motor 50 are translated through a gear 56 disposed in spaced relation to member 10 via a bracket 57. Bracket 57, in turn, is attached to member 10 via conventional fasteners or welding.

Gears 56 cooperatively engage a toothed track or rack 52 disposed along a channel 58 oriented about the vertical centerline of support member 4 as illustrated. Channel 58 is secured to both the fixed and moveable members 10 and 12, respectively, at its extreme proximal and distal ends. It is contemplated that channel 58 may be secured to member 10 and 12 with conventional fasteners. The travel of gear 56 along track 52 is limited by a mechanical stop 54 which may comprise, in its simplest embodiment, a pin or flange which physically prevents movement of gear 56. Alternatively, stop 54 may comprise an electrical sensor coupled to motor 50.

In a preferred embodiment, motor 50 is electrically actuated and is operable via 120 volt alternating current supplied from a conventional wall outlet through inlet 73 and internal wiring bus 42.

Head element 6 is fixedly secured to moveable member 10, again via conventional fasteners. Head element 6 includes, in a preferred embodiment, means to heat water supplied through inlet 70 and an outlet (not shown) oriented above base 2 so as to allow a container of varying sizes to be filled. In the embodiment illustrated in FIGS. 1 and 2, head also includes conventional funnel means 24 to hold the coffee or tea.

It is contemplated that one or more of the base 2, support 4 and head 6 may be comprised of molded, sheet stainless steel, although other materials and configurations are contemplated within the spirit of the present invention.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A beverage brewer comprising:

a base;

a support member comprising first and second elements slidably disposed with respect to each other, where said first such element is coupled to said base and the second member is coupled to a head element, said head element including means to accept a mechanism to hold either of coffee and tea;

the head element disposed a vertical distance above the base so as to allow placement of a beverage container therebetween;

means to change the vertical distance of the head element above the base; and means to maintain the head element a selected vertical distance above the base.

2. The beverage brewer of claim 1 wherein said means to maintain the head element a selected vertical distance above the base comprises a reversible motor coupled to gearing movable along a toothed track coupled to said first and second elements.

3. The beverage brewer of claim 1 wherein said support members describe a "c" shape in top cross section.

4. The beverage brewer of claim 1 wherein said means to maintain the head element a selected vertical distance above the base is controlled by switch means being connected to a power source for the brewer.

5. The beverage brewer of claim 4 wherein the head element includes a thermal actuated heat block to heat water received from an external source.

6. A beverage brewer comprising:

a base defining a substantially planar top surface:

a vertical support member comprised of a top and bottom element slidably disposed with respect to each other, where said bottom element is secured to said base and said top element is secured to a head member;

said head member including an outlet for heated water, where said outlet is disposed over said base;

a motor fixedly disposed to said top element in operative engagement with a gearing arrangement secured to both the top and bottom elements to allow said top element to be moved in a vertical direction with respect to said bottom element.

7. A beverage brewer as described in claim 6 further comprising means for heating water, said means being disposed within the vertical support member.

8. A beverage brewer as described in claim 6 wherein said head member further comprises means to accept a mechanism to hold either of coffee and tea; said means disposed to permit the heated water to pass through either of said coffee and said tea and into a container.

* * * * *